United States Patent [19]

Clements

[11] 4,139,223
[45] Feb. 13, 1979

[54] IRRIGATION PIPE COUPLER

[76] Inventor: Lloyd W. Clements, 49 W. Lincoln Ave. C., Woodland, Calif. 95695

[21] Appl. No.: 850,924

[22] Filed: Nov. 14, 1977

[51] Int. Cl.² ............................................. F16L 17/00
[52] U.S. Cl. ..................................... 285/99; 277/167.5; 277/205; 285/328; 285/352; 285/365; 285/DIG. 19
[58] Field of Search ......... 285/336, 99, 352, DIG. 19, 285/DIG. 11, DIG. 14, 110, 111, 328, 5, 365, 6; 277/207 A, 167.5, 205, 226

[56] References Cited

U.S. PATENT DOCUMENTS

| 1,071,235 | 8/1913 | Hutton | 285/DIG. 11 |
| 2,087,916 | 7/1937 | Lanninger | 285/5 X |
| 3,442,515 | 5/1969 | Murauskas | 285/99 X |
| 3,647,229 | 3/1972 | Grimes | 277/207 A |

FOREIGN PATENT DOCUMENTS 1041441 9/1966 United Kingdom ............... 277/207 A Primary Examiner—Dave W. Arola
Attorney, Agent, or Firm—Klarquist, Sparkman, Campbell, Leigh, Hall & Whinston

[57] ABSTRACT

The specification discloses a torque coupling having two tubular coupling members having flanges with interlocking teeth wedged together by a clamping ring. The flanges have opposed grooves in which are positioned elastomer sealing rings having shallow grooves with sharp edges forming vacuum seals with the bottoms of the grooves in the flanges, the rings being pressed together.

3 Claims, 5 Drawing Figures

IRRIGATION PIPE COUPLER

DESCRIPTION

This inventin relates to an improved irrigation pipe coupler, and has for an object thereof the provision of a new and improved irrigation pipe coupler.

Another object of the invention is to provide an irrigation pipe coupler having two members sealed together by a pair of abutting elastomer rings having shallow grooves forming vacuum seals with the members.

A further object of the invention is to provide a sealing ring having a groove bordered by a pair of sharp edges and adapted to form a vacuum in the groove when pressed against a member to be sealed thereto.

Figure 1:
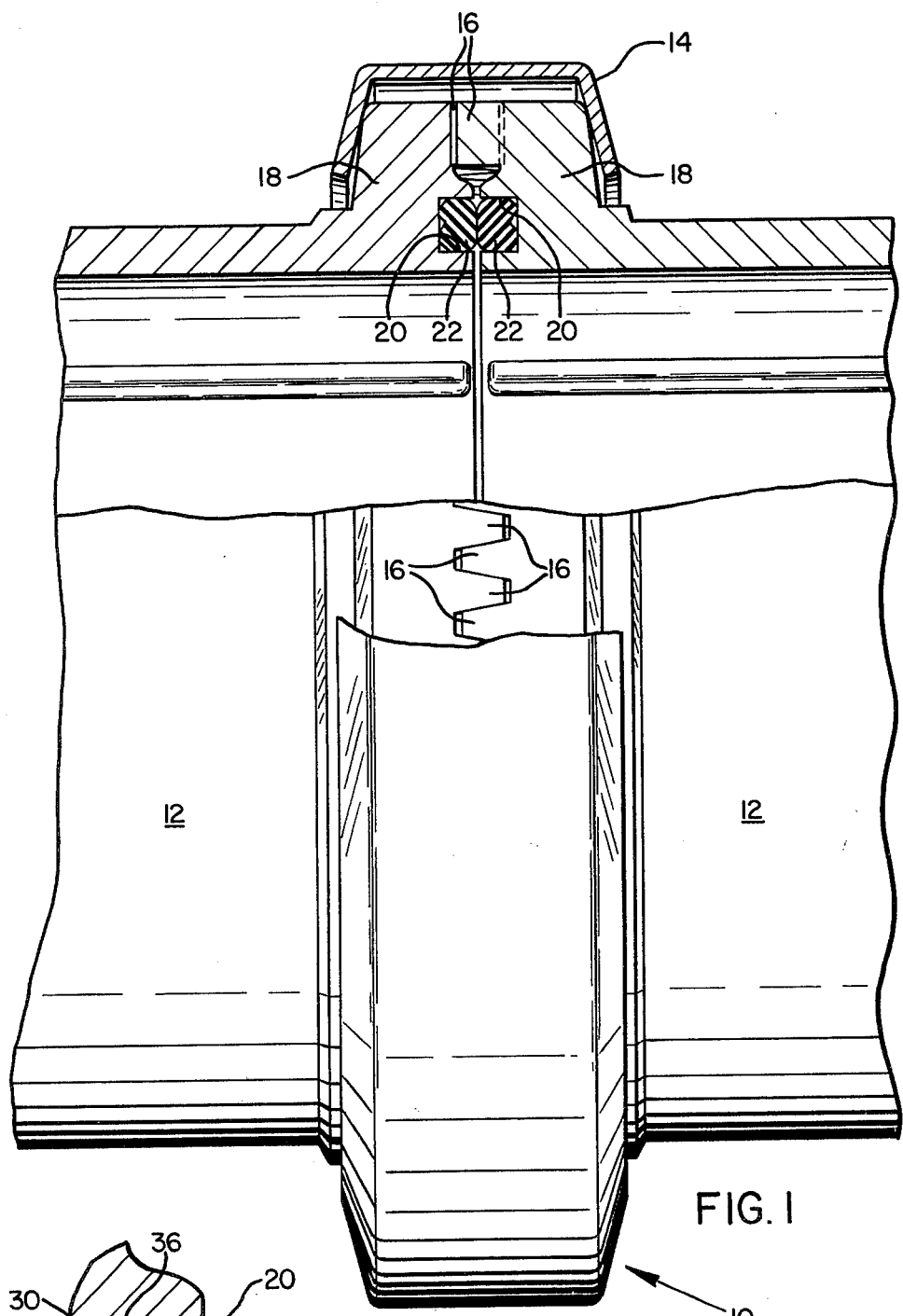
FIG. 1 is a partially sectional view of an improved irrigation pipe coupler forming one embodiment of the invention.

An improved irrigation pipe coupler 10 forming a specific embodiment of the invention includes a pair of short, identical coupler members 12 releasably clamped together with a wedging action by a split ring 14 and in sealing and torquing engagement with two irrigation pipes (not shown). The members 12 include interlocking teeth 16 on flanges 18, and have annular grooves 20 facing each other. All the above structure is old and known prior to my invention.

Figure 2:
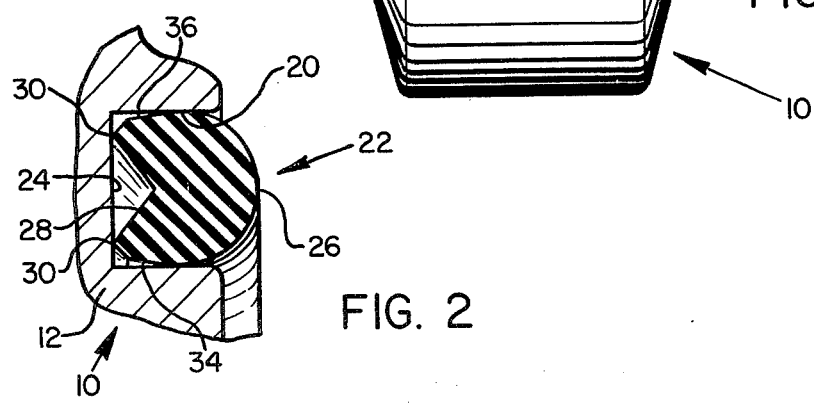
FIG. 2 is an enlarged, fragmentary, vertical section of the coupler of FIG. 1.
Figure 3:
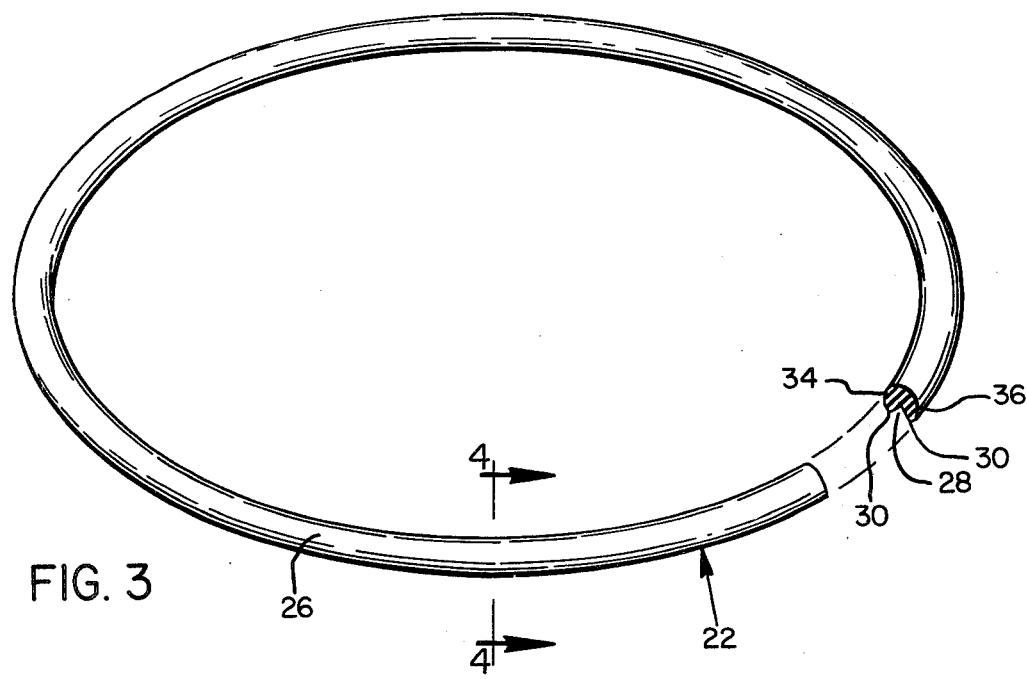
FIG. 3 is an enlarged, perspective view of a sealing ring of the coupler of FIG. 1.
Figure 4:
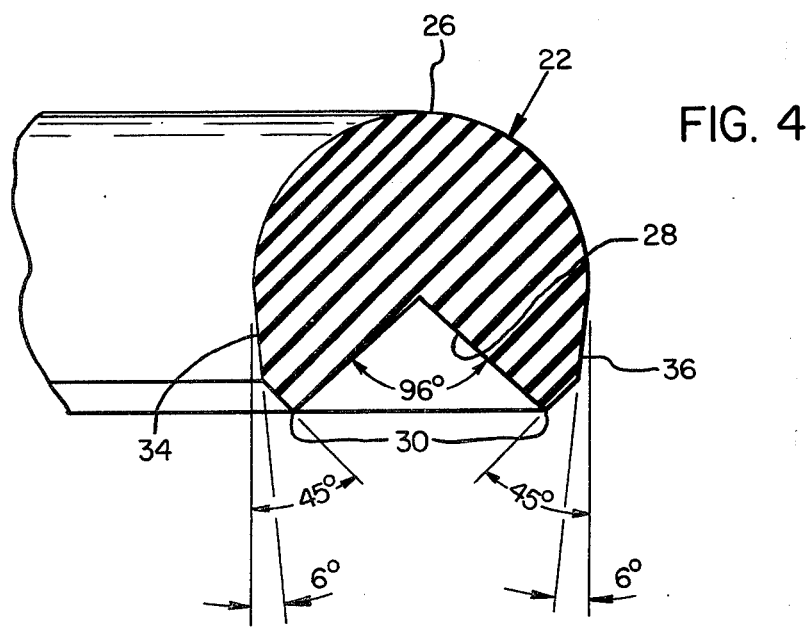
FIG. 4 is an enlarged, section taken along line 4—4 of FIG. 3.

Two vacuum sealing rings 22 form vacuum seals with bottoms 24 of the grooves 20, and are compressed against each other to form seals around the entire coupling members. The sealing rings are composed of a tough, resilient elastomer compound. One compund well suited for this is a EPDM having a durometer of sixty (60). As best shown in FIGS. 2 and 4, one entire side 26 of each ring is convex or semicircular in transverse cross-section. The other side has a continuous shallow groove 28, In the example shown, the groove is V-shaped in transverse cross-section and subtends an angle of 96° to form sharp edges 30 (90°) with bevelled outer surfaces 32 extending from tapered inner and outer surfaces 34 and 36 forming angles of 6° with tangents to the inner and outer circumferences of the ring to enable the rings to be easily inserted into the annular grooves 20.

When the split clamping ring 14 is closed, it presses the sealing rings 22 tightly together and against the bottoms 24 of the grooves 20. The engaging sides of the sealing rings are sealed tightly together and the V-vacuum seals are formed with the smooth planar bottoms 24 of the grooves 20. These seals are so good that adhesive sealing compounds are not necessary to make the joints completely watertight at high pressures; e.g. 150 p.s.i. However, the rings 22 easily separate from each other as the coupling members 12 are taken apart.

What is claimed is:

1. In an improved irrigation pipe coupler,
   a pair of pipe coupler members having opposing flanges with annular grooves having substantially planar bottoms,
   a pair of sealing rings each having in a first side thereof an annular shallow groove therin V-shaped in transverse cross-section and bordered by a single pair of sharp sealing edges,
   each groove extending entirely around the sealing ring,
   the side of each ring opposite to the first side being substatially semi-circular in transverse cross-section,
   and means for pressing the flanges together to press the sealing edges against the planar bottoms of the grooves in the flanges to form vacuums in the grooves in the rings,
   the rings normally fitting closely in and projecting beyond the grooves in the flanges and being compressed tightly in the grooves in the flanges by the pressing means.

2. The coupler of claim 1 wherein the inner and outer peripheral portions of each ring are tapered toward the sealing edges.

3. The coupler of claim 2 wherein each ring is bevelled at the immediate outside portions of the sealing edges.

* * * * *